United States Patent [19]
Heyworth

[11] 3,984,069
[45] Oct. 5, 1976

[54] VISUAL RUNWAY INDEXING SYSTEM

[76] Inventor: Eugene R. Heyworth, 3705 W. 84th Ave., Anchorage, Alaska 99502

[22] Filed: Apr. 15, 1974

[21] Appl. No.: 460,898

Related U.S. Application Data

[63] Continuation-in-part of Ser. No. 246,254, April 21, 1972, Pat. No. 3,813,064.

[52] U.S. Cl. .................... 244/114 R; 40/130 R; 40/217; 240/1.2; 340/26
[51] Int. Cl.² ......................................... B64F 1/18
[58] Field of Search ............... 244/114 R; 40/125 R, 40/125 F, 125 H, 125 N, 125 K, 130 R, 217; 116/28, 63 R, 63 P; 340/25, 26, 28; 240/1.2

[56] References Cited
UNITED STATES PATENTS

| | | | |
|---|---|---|---|
| 1,034,211 | 7/1912 | DePalma | 40/130 R |
| 1,643,585 | 9/1927 | Pitou | 40/125 H |
| 1,725,244 | 8/1929 | Bareham | 40/130 R X |
| 1,776,111 | 9/1930 | Donaldson | 340/26 |
| 2,344,639 | 3/1944 | Ressinger | 40/130 R |
| 2,404,933 | 7/1946 | Stockstrom | 340/26 |
| 3,157,374 | 11/1964 | Conrey | 244/114 R |
| 3,233,352 | 2/1966 | Projector et al. | 40/217 X |
| 3,587,184 | 6/1971 | Walker | 40/130 R |

FOREIGN PATENTS OR APPLICATIONS

| | | | |
|---|---|---|---|
| 734,953 | 6/1944 | Germany | 40/130 R |
| 371,044 | 5/1939 | Italy | 40/125 N |

*Primary Examiner*—Trygve M. Blix
*Assistant Examiner*—Barry L. Kelmachter
*Attorney, Agent, or Firm*—James C. Wray

[57] ABSTRACT

Runway distances are disclosed on sides of translucent truncated pyramids mounted on spaced runway lights. The pyramids have flat tops and two translucent sloped sides with large numerals which face the runway at 120° angles. A rear face has a port with the hinged door for installation and maintenance access. A flat bottom with a central hole completes the pyramid. Sides and bottom are joined by inner and outer riveted angular channels. Anchor plates cover inner corners of the channels. The pyramids are mounted at thousand foot intervals. Cross bars are painted across the runway between opposite pyramids to promote pilots' perception of the indexed distances. Diffusers in the pyramids wash light evenly over the translucent faces for enhanced visibility. Transformers within the pyramids step up voltage to brighten runway lights.

8 Claims, 13 Drawing Figures

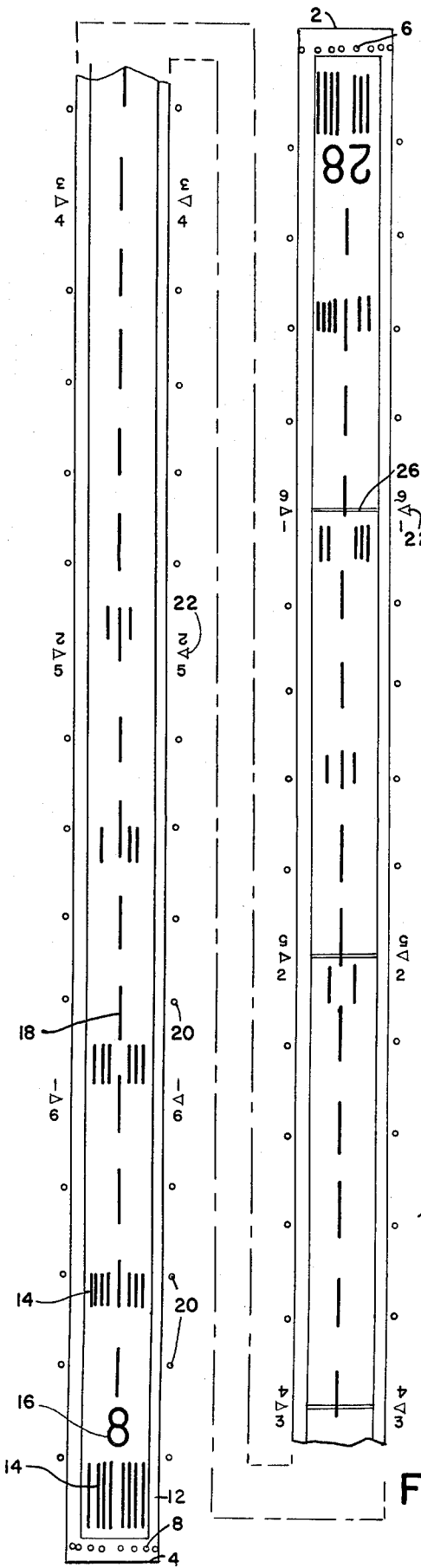

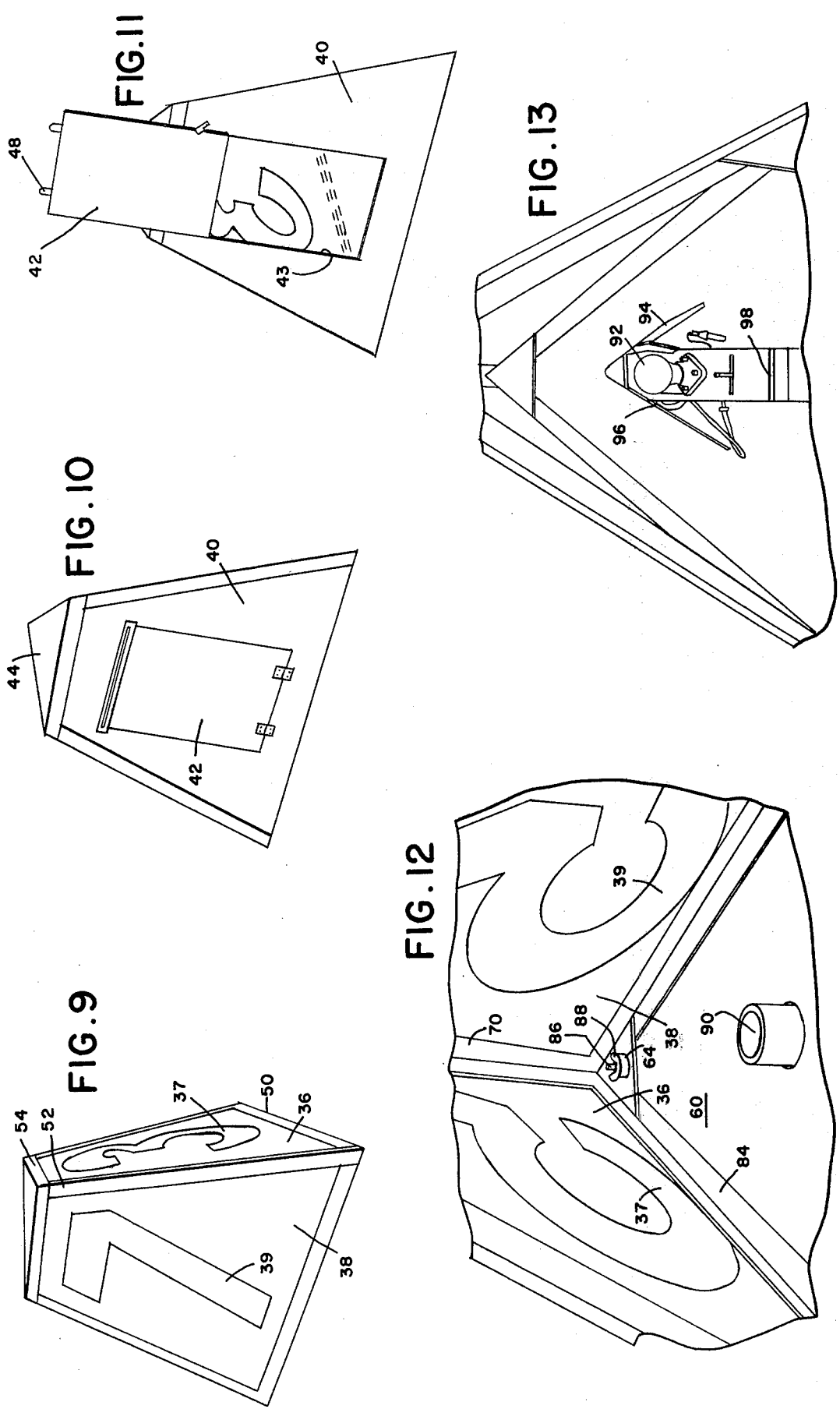

VISUAL RUNWAY INDEXING SYSTEM

The application is a continuation-in-part of copending application Ser. No. 246,254, filed Apr. 21, 1972, now U.S. Pat. No. 3,813,064, issued May 28, 1974.

BACKGROUND OF THE INVENTION

Serious aircraft accidents have been caused by lack of complete and immediate information to pilots concerning positions of aircraft on runways and especially concerning the amount of runway remaining until the end in the direction of aircraft travel. Knowledge of the length of the remaining runway is imperative for good safety during takeoff and during landing.

In takeoff procedures there are two important reasons why a pilot must know the distance to the end of the runway in the direction of aircraft travel. All aircraft have minimum runway lengths which are usable under conditions of loading. It is important that a pilot be apprised of the runway length or the length of runway between his position and the distant end in the direction of aircraft travel so that the pilot may know whether the runway length is sufficient to meet minimum takeoff requirements.

During the takeoff acceleration, it is sometimes necessary or desirable to abort a takeoff. Control failures or power losses or indications of such failures or losses may suggest danger in a continued takeoff. At varied increments of velocity each aircraft has a safe stopping distance according to loading and runway surface characteristics. It is important at all times during takeoff that a pilot know his exact position on the runway so that he can quickly consider the speed of the aircraft and the factors of weight and runway conditions in deciding whether there is sufficient distance left for aborted takeoff procedures. Bad accidents have recently been caused by pilots' believing there to be more runway remaining than was actually remaining at the beginning of their takeoff aborting procedures.

In landing an aircraft, especially in periods of low visibility, it is sometimes difficult for a pilot to tell exactly where the touchdown point was on a runway strip. Thus, the pilot may not know the distance remaining on the runway. Often, emergency braking procedures will bring the craft to a rapid and safe stop even though passenger discomfort and slight equipment damage may result. A pilot is hesitant to use those procedures of fast stopping unless he is absolutely sure that such procedures are required. In low visibility conditions, when a pilot flies over the end of the runway and does not see the touchdown end and cannot see the distant end, under present conditions he has no reference to indicate the remaining distance to the end of the runway.

There is a great need both in takeoff procedures and in landing procedures to have the actual distance remaining on a runway marked and readily visibly accessible to a pilot.

Some runway marking devices have been proposed. However, due to complexities of the structure of those devices and due to their high equipment and installation costs, the devices have not been used. However, it is extremely important that any device erected along a runway be readily collapsible so as not to present an unnecessary danger to aircraft using the runway. Marking devices which have been collapsible have been so expensive to construct and to use as to make them of little value for widespread and intensive use on runways.

Marking devices have been proposed to indicate by illumination particular sections of runways. Such devices have suggested the use of varied colored lighting creating cones of light colors which indicate position on a runway. Such systems have been expensive to install, confusing in their use and incapable of equal use in opposite senses of direction such as required by wind changes.

SUMMARY OF THE INVENTION

The present invention is a low cost, easily constructed, installed and maintained runway marking device for indicating distance remaining to an end of a runway in the direction of aircraft travel. Preferably the indexer is a lightweight truncated pyramid which fits over a runway light and which is enclosed by upward and inward sloping numeral plates to support the indicia, a rear plate with an access door, and base and top plates. The lightweight nature of the frame has several important advantages. First, it places a minimum of materials near the runway, minimizing obstructions in the event that an aircraft runs off a runway. Second, the forward translucent plates and the narrowness of the frame provide maximum light output in the direction of the runway from the runway light which is surrounded by the pyramid. Placing the indexer over the light is desirable so that the indicia are illuminated in darkness and in cases of reduced visibility. Moreover, a pilot's attention is drawn to illuminated devices. The light panels and frame make the indexer inexpensive and light to ship. The rear access door provides ready access for replacing bulbs in the runway lights as necessary.

Preferably, the indexers are positioned every thousand feet along the entire length of the runway at positions of precise measurement so that a pilot knows exactly how many thousand feet are remaining. For example, 9,000 feet would be indexed with a large 9. If a runway is precisely a number of thousand feet long when thousand foot indexes are used, indexes may be two-sided, so that they are readable from either direction of travel along the runway. Except at the middle of the runway the numbers on opposite sides of the indexers are different according to precise distances remaining in either direction of travel.

When standard runway lights are positioned at 200 foot intervals, indexers may be placed upon every fifth light to denote 1,000 foot intervals. Alternately, indexers may be placed on every light with indications of hundreds of feet remaining. Intersections where the light sequence is interrupted are accounted for in the displayed numerals.

It is highly desirable that the pilot know the exact number of feet remaining and that the indexers be accurately positioned at precise intervals along the runway. One recent aircraft accident involving loss of life and limb could have been avoided if a pilot knew that a runway was only 9,000 feet long rather than 9,500 feet long as he had been given to assume.

It is possible to use indexers which have indicia on single sides. In that embodiment, the other side faces may be obscured so that triangular forms do not erroneously cause someone to look for nonexistent numerals. Alternately, windows may be provided so that runway lights are clearly visible through the openings of the indexers to aircraft approaching from the opposite direction, obviating the possibility of confusion of opposite facing markers with markers facing in a pilot's direction.

Runway light illumination is diffused on preferred embodiments to evenly illuminate the plates without glare to make the numerals easily legible.

Indexers may be constructed of aluminum, plexiglass, plastic and fiberglass and other substances. In one form of the invention, indicia-bearing faces on indexers have reflective borders so that a pilot's attention will be directed to the indexers when aircraft are operating with landing lights.

In some applications of the invention, it is desirable to use the indexers only during the last five thousand feet or runway. When proceeding down a runway, the first indexer that pilots see carries the numeral 5. The second indexer may carry the numeral 4.5 or 4, according to the interval between markers.

In one embodient of the invention, the frame is constructed of lightweight angle pieces. The indicia carrying side may be a translucent plastic sign face of a size commensurate with a side of the frame. Fasteners attach the sign face to the side. For example, the fasteners may be metal screws inserted through holes in the sign face. Preferably, parallel inner and outer frame members are fitted around the sign face and are joined by rivets passing through the sign face and through corresponding pieces of the main frame, so that the life of the plastic sign face is prolonged.

In one embodiment, a reflective coating is added around the edge of the sign face to draw attention to the sign. In another embodiment, the reflective coating is reflective tape which is self-adhesive to the sign face and the retainer.

In a preferred embodiment, anchoring means are small truncated triangular plates which fit over frame corners and corners of the base plate. Thus the anchor plates are connected to the base adjacent the connections of the side pieces, augmenting durability of the sign. The plates are light metallic plates which extend across inner corners and which have openings for ground anchors. Ground engaging anchors are large lag bolts which are turned into the compacted runway apron. Where necessary, the ground is prepared simply by grouting, or concrete bases are poured to receive and hold the anchor bolts.

In one embodiment of the invention, the indexer is constructed as a triangular base truncated pyramid. The base is made up of two pairs of three pieces of aluminum angle, for example 24T3 or the equivalent, 0.051 inches thick. Each piece has flanges 1¼ inches wide and has a length of 36 inches. The flanges are bent to about 60° angle. Suitable extrusions may be used. The aluminum pieces are joined together at their ends to form a triangle with a flat bottom and upward and inward sloping flanges. A triangular base plate with a central runway light receiving opening and apex anchor openings is riveted at its edges between paired frame pieces.

Three pairs of 28¼ inch side pieces are joined to intersections of the base pieces. Each side piece has 1-inch wide flanges bent at about 60°. In the example, except for the width of the flanges, the side pieces and the base pieces are made of similar stock. When the side pieces are joined together by a top cap, the flanges are arranged so that they form the borders of flat triangular faces with cut off apexes.

An indicia-bearing sign face in an example is made of translucent plastic approximately 1/16th inch thick with a 36 inch base and 28¼ inch side edges in the form of an equilateral triangle with a cut off apex approximately 14½ inches across. A numeral is stenciled on the face, or a self-adhesive numeral such as those used in aircraft registration numbers of a size approximately 12 inches by 24 inches may be adhered to the face.

In a preferred embodiment, the frame is formed of paired pieces of aluminum angles having 1¼ inch flanges bent at about 60° and being constructed of material of a weight and quality suitable to hold the shapes of the sides and base. Pieces are permanently joined at their ends in triangular and truncated shapes. Complementary shapes are placed over the sign faces' back and base, and then over corresponding frame pieces of the sides and base. Rivets are placed through the frame pieces and through corresponding holes in the sides, back and base. A triangular lid having downward turned flanges is placed over upper edges of the sides and is riveted through the sides and back to flanges of an inner triangular frame piece.

The apparatus of the present invention has the advantages of quick and low cost installation and rapid and low cost production. The indexers are movable and reusable, and the parts are interchangeable. The indexers are economical and are lighted by conventional and available runway lights. The distinctive shape of the indexers makes them readily identifiable and provides proper viewing angles for pilots in aircraft. Their simple construction and light weight is important in the economics of production, shipping and installation. Their easy crushability makes them safe for use close to the runway. Although the markers are readily crushable and are light, their unique design provides a sturdiness. Their construction makes the indexers readily visible from either sense of direction and facilitates installation and servicing of the runway lights. The indexers are attractive and distinctive and provide universal recognition of their nature and meaning. Triangular signs are recognized as having information on particular cautions.

Preferably the indexer frames are alternately stacked in an inverted position and are shipped in sets with the faces installed. Upon receiving the indexers, the airport maintenance crew simply measures one thousand feet from the end of the runway and installs indexers with the number 1 on both sides of the runway over the closest runway lights. Additional thousand feet increments are measured, and the appropriate indexers are placed. Alternatively, the indicia bearing plates may be shipped independently of the frames, and the appropriate plates may be joined with the frames before or after installation of the frames at the airport.

Backs, doors and bases are constructed of polished and coated aluminum to give maximum reflectivity within the pyramids toward the translucent plates. A runway light pipe extends through a hole in the center of the base. A small step up transformer is placed in the base to increase illumination of the standard lamp. Triangular polished diffuser plates are mounted between the lamp and the transparent faces to ensure even washing of the translucent plates with light.

The remaining distance on a runway is indicated by large numerals indicating thousands of feet remaining to the end of the runway. The distance indexes inform pilots taking off of the remaining distance to the end of the runway so that the pilots may know whether aborted takeoffs are possible and so that pilots of landing aircraft may calculate necessary braking action to stop the aircraft short of the runway end. The indexes are constructed of readily collapsible double riveted aluminum angle frames having flat triangular bases and tops, and sides forming truncated pyramids are positioned directly over standard runway lights. Anchor plates at vertices of the bases overlie the double angle channel corners and provide easy anchoring independent of the lighting system. Translucent plates cover trapezoidal sides and are held in place between similar angular retainer frames made of angle aluminum pieces which form corresponding pieces in the frame. A large opaque number is positioned centrally on two plates on each index.

The object of runway distance marking is to inform the pilot of his position along the runway. The display of that information is readily discernible. Thousand foot intervals are more apparent on runways when the present black or contrasting line is painted across runways between indexers.

This system is designed so that the runway environment is presented in such a fashion that distance intervals are experienced rather than directly observed. This is accomplished by interrupting the continuity of the boundary lights at regular 1,000-foot intervals with a triangular-shaped numbered sign placed over the light and by painting cross bars 36 inches wide perpendicular to the runway centerline to cue the pilot to the specific information available at the points of boundary light pattern interruption.

Although the indexing devices are distinctive and recognizable, the addition of the painted bars on the runways makes recognition much easier. By altering, to a minor extent, standard paint markings and by placing appropriately numbered signs over existing runway boundary lights every 1,000 feet, an environment is created which promotes distance awareness.

Additionally, the distinctive picture presented by the cross bar pattern relative to the runway edge stripping provides positive information as to the lateral displacement of the aircraft from runway centerline.

In low visibilities, a pilot positioning an aircraft over the runway edge stripe, interpreting this to be centerline, would, upon observing a paint bar extending from right or left, instantly know that the runway surface could only be on the side from which the bar emanates.

Thus, by utilizing subliminal suggestion, through the placement of certain distinctive cues within the peripheral vision range, both runway distance information and lateral position are more effectively integrated into the pilot's normal inside/outside scanning pattern.

Although large billboard type distance signs have been used by the Air Force at points remote from the runway, such signs are not readily available to the pilot's peripheral vision, and the pilot's attention is not drawn to such signs. The present indexers are positioned and angled to promote readily discernible information within the pilot's peripheral vision by devices which inherently promote observation.

One object of the invention is the provision of a distance indexing system for identifying remaining length of a runway.

Another object of the invention is the provision of a safe and inexpensive runway edge remaining distance indexer.

This invention has as another object the provisions of a light frame, broad base, flat top, pyramid, three-dimentional distance marker for positioning over a runway light.

A further object of the invention is the provision of runway distance indexers having indicia on faces which are mounted in visibly accessible positions.

Another object of the invention is the provision of a triangular base pyramid runway indexer with truncated triangular faces sloped upward and along a runway and so as to face toward an oncoming aircraft with distance indicia on the face.

Another object of the invention is the provision of a readily collapsible aluminum frame distance indexer for positioning adjacent a runway edge.

Another object of the invention is the provision of visual runway distance indexers having reflective bases and backs for enhancing illumination of translucent faces.

Another object of the invention is the provision of a visual runway indexing system employing stripes across a runway at thousand foot intervals with indexes at ends of the stripes to indicate remaining thousands of feet.

Another object of the invention is the provision of airfield visual runway indexers made of frames having a rigid triangular base, truncated triangular sides and a flat triangular top together forming a soft, easily collapsible construction of a one piece rigid three-dimensional skeleton frame extending upward from the base and inward, forming a truncated pyramid with truncated triangular sides rigidly joined to a triangular base and a triangular top, and rigid anchor means fixed to the base and extending rigidly laterally across inner corners of the base adjacent junctions of the base and the sides, at least one similarly shaped truncated triangular translucent plate positioned adjacent one side of the frame with a large numeral fixed on the plate, a base plate and a back plate completing the enclosure, and the frame further consisting of a retainer formed of metallic angle pieces rigidly joined at ends thereof to form a similar truncated triangle and being fitted over edges of the plate and being fitted over adjacent peripheral frame members of the sides and base, thereby fastening the plate on the frame sides.

These and other objects of the invention are apparent in the disclosure, which includes the foregoing and ongoing specification and claims and the drawings.

BRIEF DESCRIPTION OF THE DRAWINGS

FIG. 1 is a plan view of a visual runway distance indexing system according to the present invention.

FIG. 2 is a plan view of an indexer constructed according to the invention.

FIG. 3 is a side elevation of an indexer.

FIG. 4 is a rear elevation of an indexer.

FIG. 5 is a detail of an access door.

FIG. 6 is a detail of a base plate.

FIG. 7 is a detail of an anchor plate.

FIG. 8 is a sectional detail of a frame and side plates.

FIG. 9 is a perspective view of an indexer.

FIG. 10 is a rear view with the door closed.

FIG. 11 is a rear view with the door open.

FIG. 12 is an inner detail of the indexer.

FIG. 13 is an inner detail of the indexer showing a transformer, lamp and diffuser.

DETAILED DESCRIPTION OF THE DRAWINGS

Referring to FIG. 1, a runway is generally indicated by the numeral 1. One end 2 of runway 1 is the end that pilots would approach when using runway number 28 at a heading of approximately 280°. The other end 4 of runway 1 is the end of the runway which pilots would approach when using the runway number 8 with a heading of 80°. At both ends of the runway 1 are positioned a number of runway indicator lights 6 and 8. The hard surface of the runway is surrounded by an apron 12. Markings 14 in contrasting colors to the surface are placed on the runway in the usual manner. The runway numerical indication 16, which indicates the heading of the particular runway, is positioned on the runway. A centerline marked in a color which contrasts with the runway is indicated by the numeral 18. Runway boundary lights 20 are positioned at intervals along opposite edges of the runway apron. Usually the runway boundary lights 20 are positioned at 200 foot intervals. In the present invention every fifth runway boundary light is replaced with an indexing truncated pyramid 22 which indicates by the numerical indicia on faces of the pyramids the number of thousand foot intervals remaining to the end of the runway. Preferably, the indexers 22 are placed at thousand foot intervals along the runway. In a preferred embodiment, indexers 22 are on opposite sides of the runway and are joined by heavy lines 26 in contrasting colors to the runway surface. The heavy lines 26 insure that the pilot's attention is called to the distance remaining indications on indexers 22 and insure that the distance remaining information is part of the total experiance rather than a requirement of separate conscious effort.

As shown in the remaining figures, preferred indexers generally indicated by the numeral 30, have generally truncated pyramidal shapes. Distance information indicia is carried on the two translucent side plates 34. Side plate 36 has a numeral 37, and side plate 38 has a numeral 39, each of which is visible from an opposite direction of travel along the runway. A pilot who has just started on a runway will experience the indicia 37 indicating that 8,000 feet are remaining on the runway. A pilot at another time coming from the opposite direction will experience the indicia 39, indicating that only 2,000 feet remain on the runway.

The rear side of the indexer 30, which faces away from the runway, is covered by a rear side plate 40. As shown in FIG. 4, fastener holes 41 are provided along all edges of plate 40. Similar fastener holes are provided along the edges of translucent side plates 34.

As shown in FIGS. 2, 4 and 5, the rear plate 40 has an access door 42 which covers an access opening 43.

The door 42 is connected to plate 40 by a hinge 46 at the top of the door. The bottom of the door is provided with downward extending lugs which hold half turn fasteners 48 for engaging appropriate holes in the plate 40 between door opening 43.

As shown in FIG. 2, a cap 44 completes the enclosure of the pyramid shape. Triangularly joined base frame members 50 are composed of inner and outer angular frame pieces. Side frame members 52 extend upward and inward from apexes of triangular base frame members 50. Flanges 54 of cap 44 extend downward over upper ends of side frame members 52 and over upper edges of side plates 34 and rear plate 40.

As shown in FIG. 6, a base plate 60 is a triangular plate having a central opening 62 for receiving the holder pipe of a runway light. Hold down plates 64, as shown in FIG. 7, have central openings 66, through which anchor bolts are placed.

FIG. 8 is a detail of the side frame members 52. Preferably the side frame members 52, as all of the other frame members, are constructed of parallel outer and inner angle pieces 52 and 70. The inner angle piece 70 is constructed, for example, of 0.051 inch aluminum sheet, with 1⅜ths inch flanges 72 and 74 bent at angles. The outer frame member 52 is formed of 0.032 inch aluminum sheet with 1¼ inch flanges 76 and 78 bent at corresponding angles. A soft aluminum pop rivet 80 interconnects the transparent side plate 34 between flanges of the inner and outer frame members. The rivets 80 are fastened through holes 82 which are found in all of the edges of the plates.

As an example, plates 34 may be formed of 0.080 inch filon-fiberglass. The rear side plate 40 and door 42 may be formed of 0.040 inch aluminum sheet. Hinge 46 is a piano type hinge, and fasteners 48 are lion winged quick fasteners.

An inner face angle frame member 84 is shown in FIG. 12. Also shown in FIG. 12 are bolts 86, which have been anchored to the ground and washers and wing nuts 88, which are used to overlie anchor plates 64, frame members 84 and base plates 60 to hold the entire indexer pyramids down.

A runway boundary light extension pipe 90 is shown in FIG. 12 as projecting through the holes in the center of base plate 60.

In FIG. 13, the rear plate has been removed to reveal the lamp 92, which is placed in the socket between polished aluminum deflector plates 94 and 96. The deflector plates reflect light from lamps 92 against polished inner surfaces of base plate 60 and rear plate 40 and door 42 to evenly wash the translucent plates 36 and 38 with light.

A transformer 98 is positioned inside the truncated pyramid indexer to step up the voltage to lamp 92 for brightening the lamp and increasing its illumination output.

Although the invention has been described with reference to specific embodiments, it will be obvious that modifications and variations may be made. The scope of the invention is defined in the following claims.

I claim:

1. Visual runway indexing system comprising an indexer having a frame comprising parallel spaced angle pieces with plate edges fixed therebetween, the angle pieces being arranged in a generally triangular base frame and side frames extending upward an inward from apexes of the base frame to a spaced apart triangular upper arrangement, and cap means fitted on upper ends of the side frame members for joining the upper ends, translucent side plates mounted between adjacent side frame members and between bottom frame members and the cap, and a rear side plate mounted between adjacent side frame members, completing a closed truncated pyramid shape of the indexer.

2. The visual runway indexing system of claim 1 wherein the translucent side plates bear numerical indicia.

3. The visual runway indexing system of claim 1 wherein the translucent sides plates and the rear side plates have truncated triangular form and have fastener holes along edges of the plates which are covered by frame members, and wherein frame members have holes corresponding with the holes in the plates, and further comprising fasteners inserted through the holes for securing inner and outer frame members together with plate edges interposed therebetween.

4. The visual runway indexing system of claim 3 wherein the fasteners comprise soft aluminum pop rivets.

5. The visual runway indexing system of claim 1 further comprising a door opening in the rear side plate and a door covering the opening, hinge means connected to the top of the door and to the top of the door opening for permitting the door to swing upward, and fastener means at the bottom of the door and the door opening for permitting the door to be fastened in a closed position.

6. The visual runway indexing apparatus of claim 1 further comprising a base plate connected to the base frame, the base plate having a central opening for positioning over a fitting of a runway boundary light, completing the pyramid shape indexer.

7. The apparatus of claim 6 further comprising truncated triangular anchor plates positioned over frame members portions and over apex portions of the base plate and having holes extending through the anchor plates and through the base plates for receiving anchor bolts.

8. The visual runway indexing system of claim 1 wherein the indexers are positioned on opposite sides of runway boundaries at 1,000 foot intervals and further comprising contrasting lines on the runway surface interconnecting the opposite indexers and being oriented perpendicular to elongated directions of the runway.

* * * * *